United States Patent [19]

Magnusson et al.

[11] 4,375,076
[45] Feb. 22, 1983

[54] CYCLICALLY CONTROLLED ELECTRICAL EQUIPMENT HAVING A CONTROL ANGLE WHICH IS VARIABLE OVER A PORTION OF THE OPERATING CYCLE

[75] Inventors: Harry Magnusson, Vasteras; Göte Tallbäck, Helsingborg; Ake Wennberg, Vasterås, all of Sweden

[73] Assignee: ASEA Aktiebolag, Vasterås, Sweden

[21] Appl. No.: 138,802

[22] Filed: Apr. 9, 1980

[30] Foreign Application Priority Data

Apr. 9, 1979 [SE] Sweden ................................ 7903123

[51] Int. Cl.³ ........................................... H02M 7/155
[52] U.S. Cl. ................................ 363/68; 318/345 G; 363/128
[58] Field of Search ............... 318/82, 345 G; 363/44, 363/68–70, 118, 128, 129

[56] References Cited

U.S. PATENT DOCUMENTS 4,245,291 1/1981 Tsutsui et al. ......................... 363/68
4,306,283 12/1981 Kiwaki et al. ......................... 363/68

FOREIGN PATENT DOCUMENTS 1204319 11/1965 Fed. Rep. of Germany ........ 363/68
2514279 7/1976 Fed. Rep. of Germany ........ 363/68
2609285 9/1977 Fed. Rep. of Germany ........ 363/68

Primary Examiner—William H. Beha, Jr.
Attorney, Agent, or Firm—Pollock, Vande Sande & Priddy

[57] ABSTRACT

An electrical converter equipment for providing a d.c. voltage from an alternating current source. The converter has a unique operating cycle wherein a variable control angle is effected. The operating cycle for the converter comprises a series of half periods of the alternating current source. During different periods of time, the converter operates with different control angles. The control cycles comprise n periods of the input signal, where n is an odd number not less than three. During two half periods of a cycle, the control angle is varied. During two other half periods of the cycle, the converter operates at a fixed control angle. The half periods during which the converter is controlled with a variable control angle are time equidistant.

6 Claims, 11 Drawing Figures

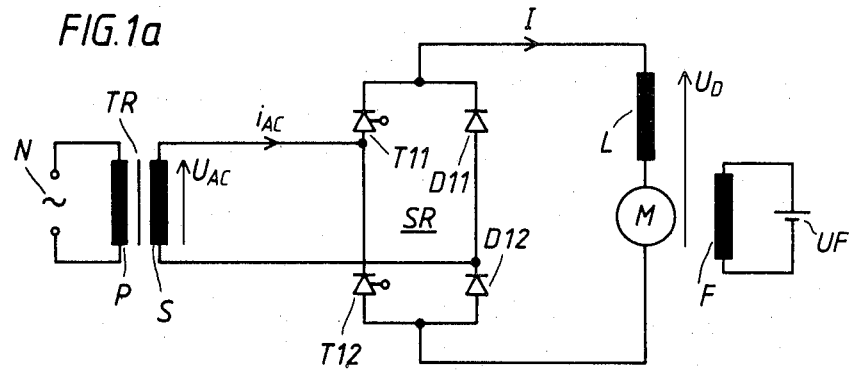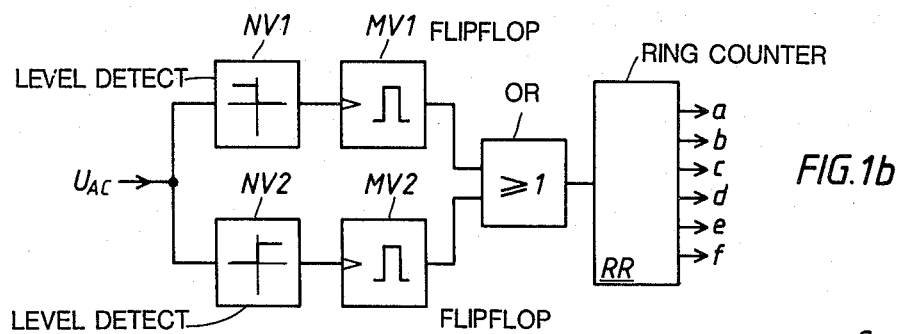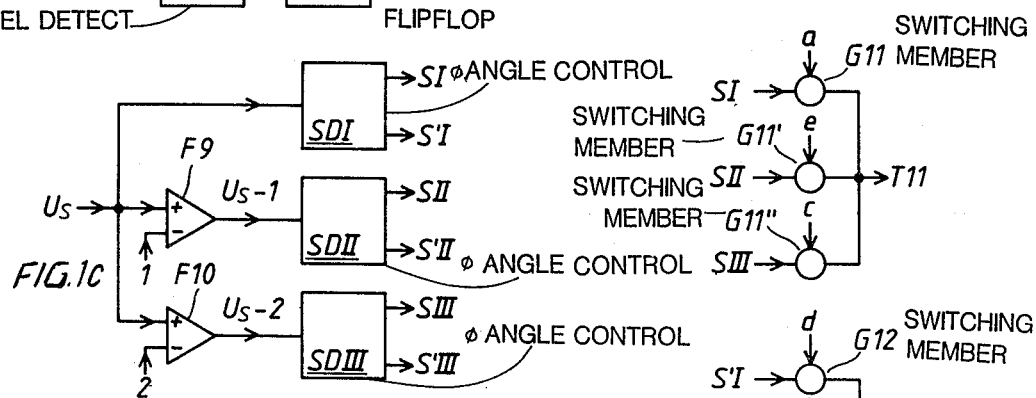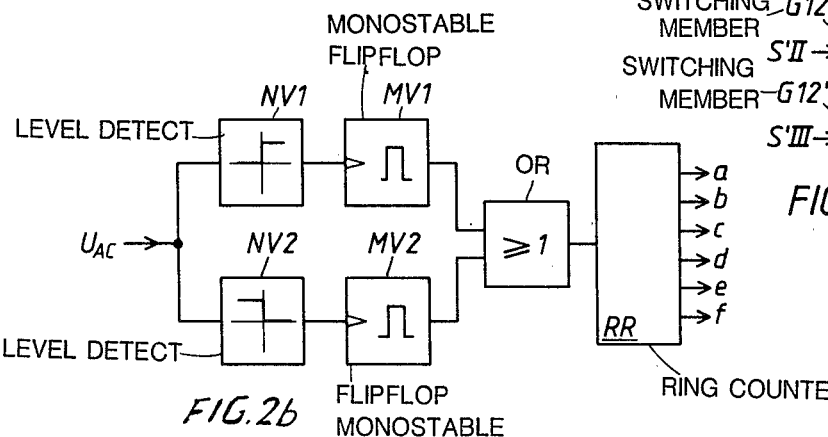

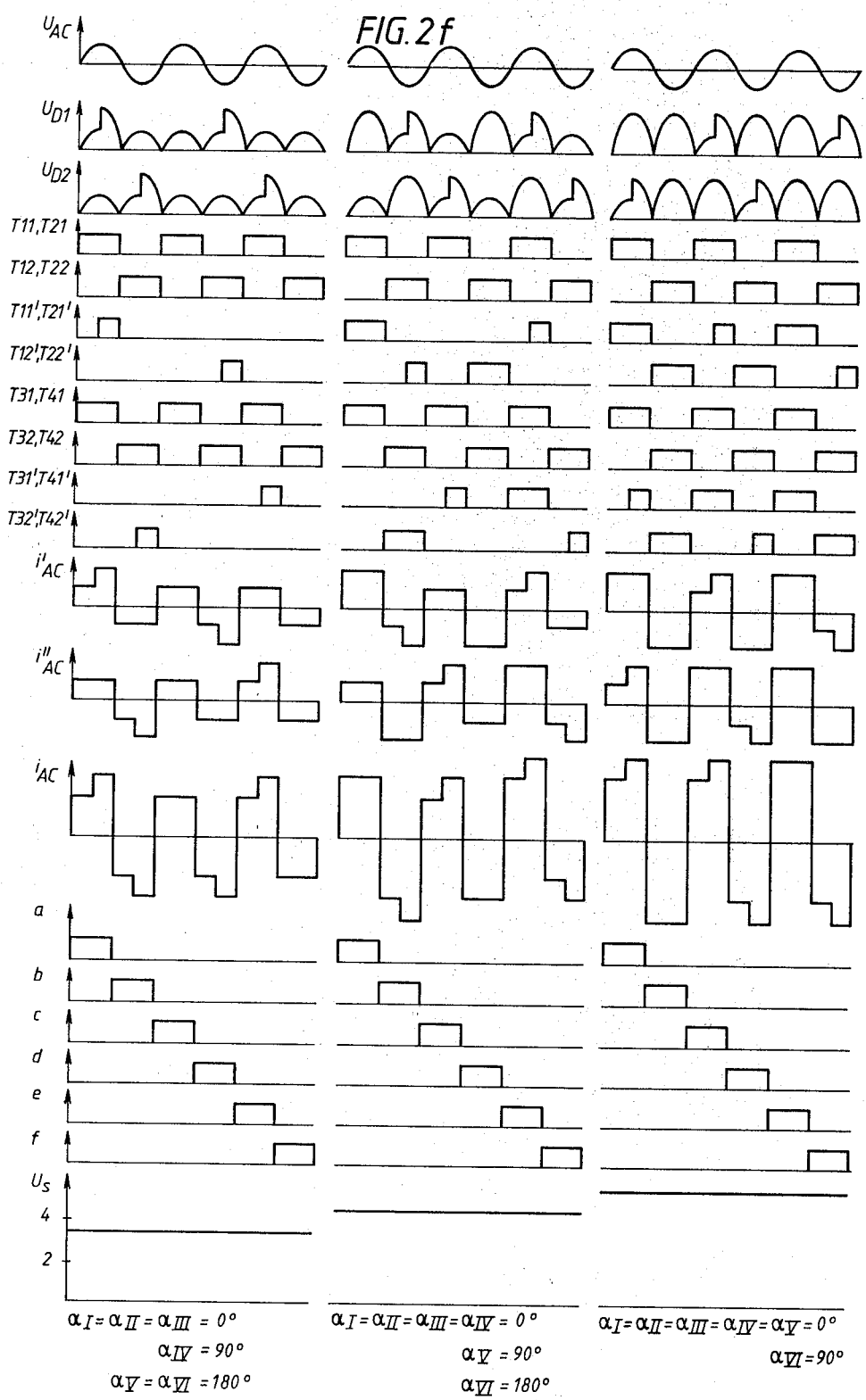

CYCLICALLY CONTROLLED ELECTRICAL EQUIPMENT HAVING A CONTROL ANGLE WHICH IS VARIABLE OVER A PORTION OF THE OPERATING CYCLE

TECHNICAL FIELD

This invention relates to converter equipment for supplying one or more d.c. load voltages the equipment being of the kind comprising a controllable converter connected to an alternating voltage source, the converter having a by-pass path for the direct output current. The equipment comprises control means for controlling the direct voltage of the converter by influencing the control angle of the converter. The control means is arranged to operate cyclically in such a manner that each cycle comprises a plurality of half-periods of the alternating voltage of the source and that the converter within at least part of its control range operates with different control angles during the different half-periods of a cycle.

For certain applications of controllable converter equipment connected to an alternating voltage network or other alternating voltage source, it is of great importance that the consumption of reactive power by the equipment is maintained at a low level, thus increasing the power factor of the equipment. Such an application is in vehicle-borne converter equipment for supplying the d.c. drive motors of a vehicle with a current from an alternating voltage-carrying contact line or contact rail. For these applications it is also important that the harmonic content of the alternating current of the converter equipment should be low, among other things, avoiding telecommunications interference. Furthermore, it is also important that the alternating current of the equipment not include any d.c. component, since such a component would give rise to saturation phenomena in transformers or generators.

BACKGROUND ART

It is known to use, in converter equipment, so-called asymmetrically semi-controlled single-phase converter bridges which, between the d.c. connections, have two thyristor branches connected in series with each other, and in parallel with two diode branches connected in series with each other. Such a converter normally has a lower consumption of reactive power than a conventionally controlled single-phase bridge having thyristors in all four branches. The consumption of reactive power is, however, still high, and often unacceptably high when the bridge voltage is controlled to a fraction of its maximum value.

It is also known that an additional reduction of the consumption of reactive power (i.e. an increase of the power factor) may be achieved by series-connecting two or more bridges, for example of the above-mentioned kind, in a converter, and by controlling the converter so that always at the most one bridge works with a variable control angle while the other bridges are controlled either to maximum or minimum direct voltage. However, converters of this kind require a relatively large number of semiconductor components (thyristors and diodes), and therefore they are complicated, bulky and expensive.

British patent specification No. 1,497,045 discloses converter equipment in which a converter consists of two series-connected asymmetrically semi-controlled bridges. To achieve an even load distribution between the secondary windings of the converter transformer, while at the same time obtaining a low consumption of reactive power, each of the two bridges is controlled cyclically, the cycles for the two bridges being displaced in time with respect to each other. The length of the cycle is one or two full periods. During each of the half-periods of the cycle, one of the bridges is always working with a variable control angle, that is, the control angle generally assumes a value which deviates from the values (0° and 180°) for which the harmonic content of the mains alternating current and the consumption of reactive power are lowest. The consumption of reactive power and the harmonic content of the alternating current are therefore relatively high. Furthermore, this known equipment requires that each converter should comprise at least two d.c. series-connected bridges, which makes the equipment relatively complicated and expensive.

The present invention aims primarily to provide converter equipment in which it is possible to achieve—with a simple converter, for example with a single converter bridge—a lower consumption of reactive power and a lower harmonic content of the main alternating current supply than has hitherto been possible with equipment of a corresponding degree of complexity.

A subsidiary aim of the invention is to provide equipment with one or more simple converters in which the d.c. component in the alternating current of each individual converter is zero. This makes it possible to completely eliminate the direct voltage component in the alternating current of the equipment, both in equipment having a single converter and in equipment having several converters with different load objects.

SUMMARY OF INVENTION

According to the invention, an electrical converter equipment of the kind referred to is provided wherein each of the cycles comprises n periods of the alternating voltage of the source, n being an odd number not less than three. The control means is arranged, during two of the half-periods of the cycle, to control the converter with a control angle which is variable for influencing the direct voltage of the converter and, during each of the other periods of the cycle, to control the converter with a fixed control angle. The half-periods during which the converter is controlled with a variable control angle are equidistant.

BRIEF DESCRIPTION OF DRAWINGS

The invention will now be described, by way of example, with reference to the accompanying drawings, in which.

DESCRIPTION OF PREFERRED EMBODIMENTS

FIG. 1a shows a converter equipment for supplying the armature M of a d.c. motor. The motor has a field winding F which is supplied from a d.c. source UF. An inductor L for smoothing the armature current of the motor is connected in series with the armature M, so that the load supplied by the converter equipment is constituted by the armature M and the inductor L.

The equipment comprises a converter SR, consisting of a semi-controlled thyristor bridge having two thyristor branches and two diode branches. The diode branches, connected in series with each other, form a by-pass path for the direct current through the bridge. Each thyristor and diode branch is shown and treated in the following as if it comprised a single semiconductor element. This may be the case but each branch may, of course, as an alternative consist of two or more series-connected, parallel-connected or series-parallel-connected semiconductor elements. Thus, the converter SR is shown as having thyristors, T11 and T12, and two diodes, D11 and D12. The two thyristors of the equipment are phase-angle controlled from control circuits which will be described hereinafter with reference to FIGS. 1b–1d.

The d.c. connections of the converter are connected to the load consisting of the motor armature M and the smoothing inductor L. The direct current of the converter is designated I and its direct voltage is designated $U_D$. The a.c. connections of the bridge are connected to an a.c. supply network N via a transformer TR. The transformer has a primary winding P and a secondary winding S and supplies the alternating voltage $U_{AC}$ and the alternating current $i_{AC}$ to the converter.

As with semi-controlled bridges in general, the rule applies that when a thyristor is not current-carrying, the current flows through the diode which is connected to the same d.c. connection of the bridge. When no thyristor is conducting, the direct current of the bridge therefore flows through the two series-connected diode branches, which thus serve as a by-pass path for the direct current, and the direct voltage of the bridge becomes zero.

FIGS. 1b–1d show the control circuits for the equipment according to FIG. 1a. The converter equipment is supplied with a control signal $U_S$, for example from a control device for controlling the speed and/or armature current of the motor.

Figure 1E:
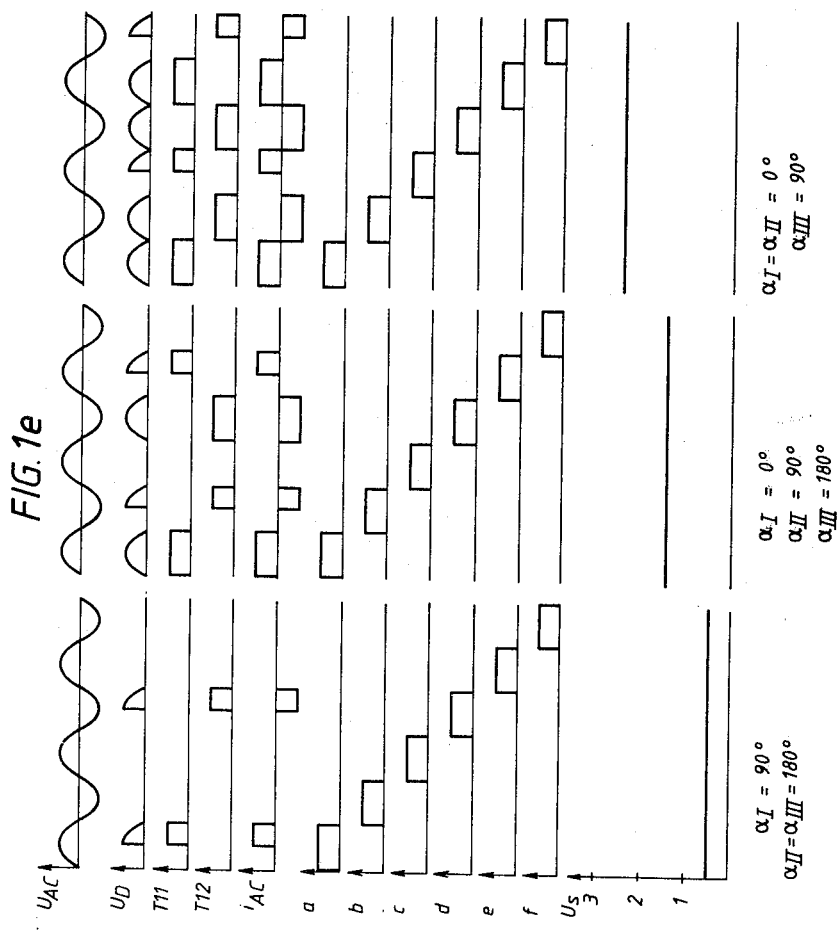
FIG. 1a is a diagram of the main circuits in one embodiment of equipment in accordance with the invention, in which a converter consisting of a single bridge supplies a d.c. motor.
FIGS. 1b, 1c and 1d are diagrams of the control circuits of the equipment according to FIG. 1a, FIG. 1e is a series of graphs showing some of the electrical currents and voltages occurring in the equipment of FIG. 1a plotted against time.

FIG. 1b shows a circuit for deriving six signals a, b, c, d, e, f, which are used for controlling the converter. The mains supply voltage $U_{AC}$ is supplied to two level flip-flops NV1 and NV2, each of which delivers a "1" signal during every second half-period. These signals are supplied to monostable circuits MV1 and MV2, which supply short "1" pulses at the start of each half-period of the mains voltage. These pulses are supplied to the control input of a ring counter RR via an OR circuit OG, said ring counter having six outputs a–f. Each pulse steps the ring counter one step forward. During three periods of the voltage $U_{AC}$ the ring counter completes a cycle, and during this cycle each of the signals a–f is "1" during one half-period and "0" during the remainder of the cycle. The signals a–f are shown in the lower part of FIG. 1e. Thus, one cycle comprises six half-periods, that is, three periods of the mains supply voltage.

FIG. 1c shows three phase-angle control devices SDI–SDIII, which are identical with each other. Each of these (e.g. SDI) delivers control pulses (SI and S'I), offset in phase 180°, with a control angle varying between 0° and 180° in dependence on the control signal supplied to the control device. The control angle α for the thyristors, controlled by a control device, varies in dependence on the input signal $U_i$ of a control device between 0° and 180° in such a manner, known per se, that $$\alpha = \arccos(2U_i - 1)(0 \leq U_i \leq 1)$$

The additions to the direct voltages of the converter, provided by the thyristors controlled by the control device, will thus vary linearly with the input signal $U_i$ of the control device within the interval $0 \leq U_i < 1$. For $U_i \leq 0$, $\alpha = 180°$. For $U_i \geq 1$, $\alpha = 0$, that is, the thyristors are controlled to maximum direct voltage.

A control signal $U_S$ which may be varied continuously between 0 and 3 is supplied to the control device SDI directly and to the other control devices through amplifiers F9 and F10, in which constants corresponding to $U_S = 1$ and $U_S = 2$ are subtracted from $U_S$. When $U_S$ increases from 0 the control angles $\alpha_I$, $\alpha_{II}$ and $\alpha_{III}$ for the three control devices will therefore vary as follows:

|  | $\alpha_I$ | $\alpha_{II}$ | $\alpha_{III}$ |
|---|---|---|---|
| $U_S = 0$ | 180° | 180° | 180° |
| $0 < U_S < 1$ | $180° > \alpha_I > 0$ | 180° | 180° |
| $U_S = 1$ | 0° | 180° | 180° |
| $1 < U_S < 2$ | 0° | $180° > \alpha_{II} > 0$ | 180° |
| $U_S = 2$ | 0° | 0° | 180° |
| $2 < U_S < 3$ | 0° | 0° | $180° > \alpha_{III} > 0$ |
| $U_S = 3$ | 0° | 0° | 0° |

FIG. 1d shows how the control pulses from the control devices are supplied to the thyristors of the equipment via electronic switching members G11, G11', etc. Thus during the first half-period of a cycle (a="1"), the thyristor T11, for example, is supplied with the control signal SI from the control device SDI, during the third half-period of a cycle (C="1") it is supplied with the control signal SIII from the control device SDIII, and during the fifth half-period of a cycle (e="1") it is supplied with the control signal SII from the control device SDII. The corresponding is true of the thyristor T12.

FIG. 1e is a series of graphs showing the function of the equipment during a cycle for each one of three different direct voltages corresponding to $U_S = 0.5$, $U_S = 1.5$ and $U_S = 2.5$. The uppermost graph shows the mains voltage $U_{AC}$ and below this are shown the direct voltage $U_D$, the currents through the thyristors T11 and T12, the mains current $i_{AC}$, the signals a–f from the ring counter RR, and the control signal $U_S$.

As can be seen, a half-period with a certain control angle is always followed after three half-periods by a half-period with the same control angle but with opposite polarity of the alternating voltage. For example, at $U_S = 1.5$, every third half-period (the first and fourth in the cycle) is controlled with the control angle 0°, every third half-period (the second and fifth in the cycle) is controlled with the control angle 90°, and every third half-period (the third and sixth) is controlled with the control angle 180°. During one cycle, each half-period of the mains current will therefore always correspond to an identical half-period of the opposite polarity, and d.c. component of the mains current becomes zero.

With respect to reactive power and harmonic content, the converter according to FIG. 1a corresponds to a known converter having three series-connected bridges controlled one after the other, and therefore, with only one bridge, results in the same low consumption of reactive power, the same high power factor, and the same low harmonic content as was achieved in the previously known connection with three bridges.

In the example described above with reference to FIGS. 1a–1e, the length of the cycle comprises three periods. Generally, the length of the cycle in the control method shown may be n periods, where n is an odd number which is equal to or greater than three, and the function from the reactive power point of view corresponds to what may be obtained with a known converter having n series-connected bridges.

Figure 2C:
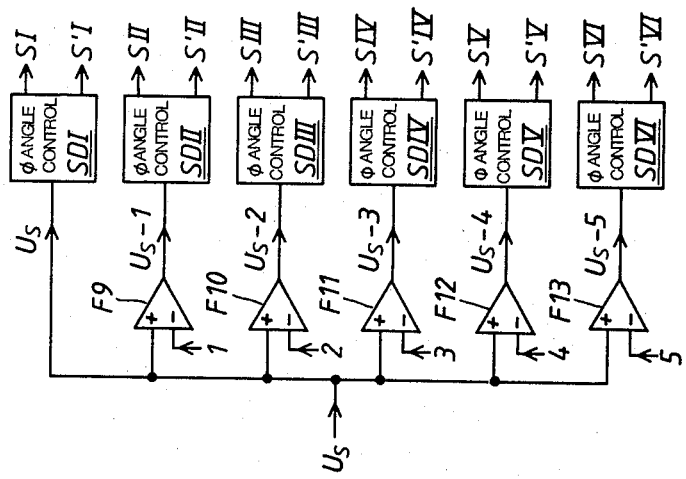
FIGS. 2b, 2c and 2d are diagrams of the control circuits of the equipment according to FIG. 2a, and FIGS. 2e and 2f are graphs showing some of the quantities occurring in the equipment of FIG. 2a, plotted against time.
Figure 2A:
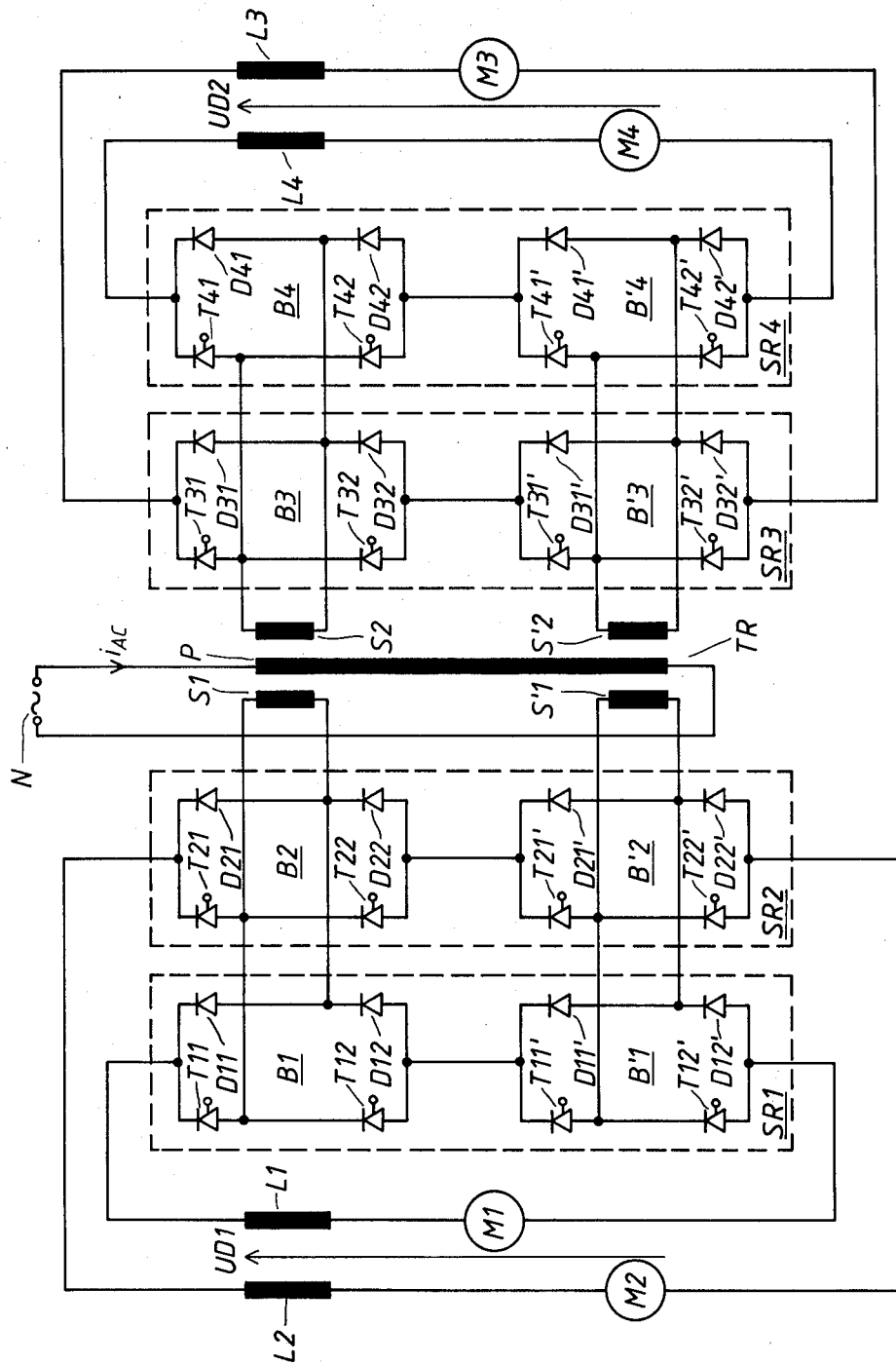
FIG. 2a is a diagram of the main circuits of another embodiment of equipment in accordance with the invention, having four converters.

FIG. 2a shows a converter equipment having four converters SR1–SR4. Each converter consists of two series-connected bridges B1–B4 and B'1–B'4. Each bridge is controlled in the manner described with reference to FIGS. 1a–1e. With an increasing direct voltage in each converter, the upper bridge is first controlled to maximum direct voltage and thereafter the lower bridge. The converters are controlled such that the mean values of their direct voltages are always equal. The converters SR1 and SR2 are controlled synchronously with each other and form a first module. Similarly, the converters SR3 and SR4 are controlled synchronously with each other and form a second module. The converters are supplied from the a.c. network N via a transformer TR with secondary windings S1, S2, S1', S2'. Each converter has a separate load consisting of a d.c. motor M1–M4 in series with a respective smoothing inductor L1–L4.

FIG. 2b shows the circuit for generation of the signals a–f and corresponds entirely to the circuit shown in FIG. 1b.

FIG. 2c is analogous to FIG. 1c but differs from this by the addition of three more control pulse devices SDIV–SDVI with the amplifiers F11–F13. In the amplifiers F11–F13, quantities corresponding to $U_S=3$, $U_S=4$ and $U_S=5$ are subtracted from the control signal $U_S$. The result is that when $U_S$ varies from 0 to 6, the control pulse devices will reduce their control angle one at a time and in due order from 180° to 0°.

Figure 2D:
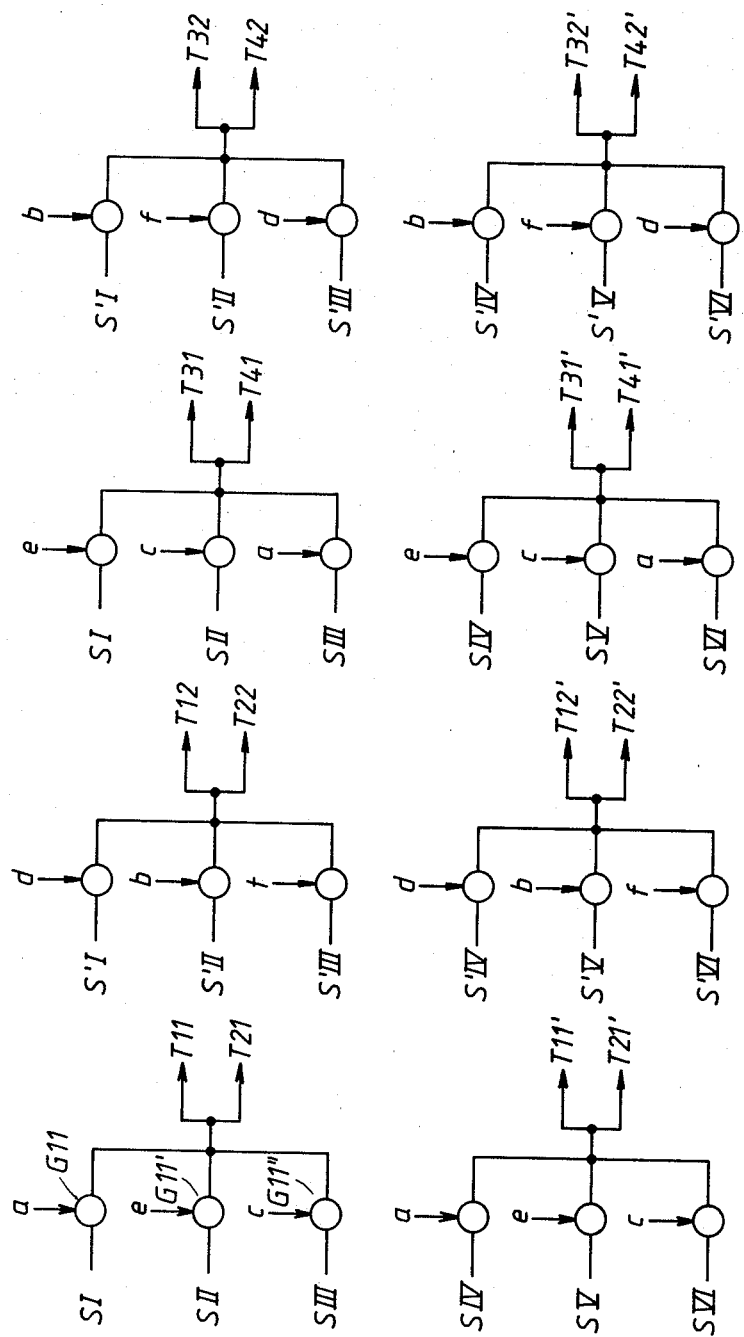

FIG. 2d shows how the control pulses from the control pulse devices are supplied to the thyristors of the equipment in dependence on the signals a–f. In the same way as, for example, in FIG. 1d, the signals a–f control gates (e.g. G11, G11', G11'') which admit the control pulses to the thyristors.

Figure 2E:
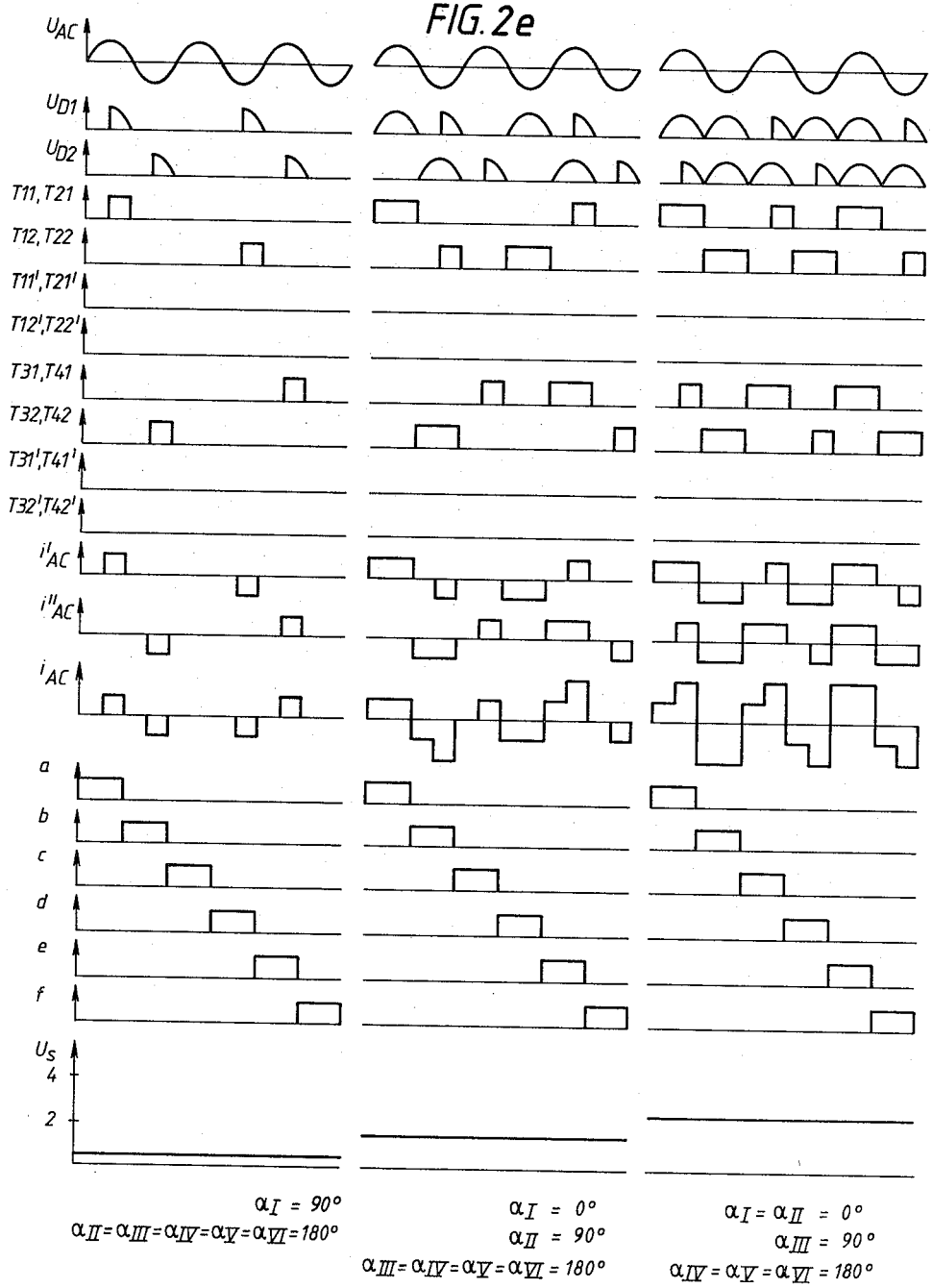

FIG. 2e and FIG. 2f are series of graphs showing the mode of operation during a cycle for each of six different values of the control signal $U_S$. In each of these Figures, the uppermost graph shows the mains voltage $U_{AC}$ and the graphs below this show the direct voltage $U_{D1}$ from the converters SR1 and SR2, the direct voltage $U_{D2}$ from the converters SR3 and SR4, the currents through the thyristors of the equipment, the alternating current $i'_{AC}$ from the first module (SR1 and SR2), the alternating current $i''_{AC}$ from the second module (SR3 and SR4), the resultant mains alternating current $i_{AC}$ ($i_{AC}=i'_{AC}+i''_{AC}$), the signals a–f, and the control signal U.

FIG. 2e shows the function for the control signals $U_S=0.5$, $U_S=1.5$ and $U_S=2.5$, and FIG. 2f shows the function for the control signals $U_S=3.5$, $U_S=4.5$ and $U_S=5.5$. As is clear from these Figures, each bridge is controlled separately in the manner described with reference to FIGS. 1a–1e, whereas the upper bridge of each converter is controlled to maximum direct voltage before the control of the lower bridge is started.

The control pattern for the second module (SR3+SR4), that is, the sequence of half-periods with certain control angles, is identical with the control pattern for the first module (SR1+SR2) but is displaced by four half-periods to a later point in time (or by two half-periods to an earlier time). This displacement between the modules results in lower variations and a lower harmonic content of the mains supply alternaing current than if the two modules are controlled simultaneously (which is, of course, also possible).

The equipment described with reference to the drawings may be used for the supply of traction motors in an electric vehicle, for example an electric locomotive, in which the low consumption of reactive power and the high power factor accomplished with a low number of components and a simple construction are a considerable advantage. It has further been found that the harmonic content of the mains alternating current, weighted with respect to telecommunications interference, becomes considerably lower than in the previously known converter equipment with the same number of bridges for each converter, which is an important advantage especially in traction equipment.

A considerable number of other embodiments of the invention are feasible. The d.c. loads of the converters may, for example, consist of loads other than d.c. motors, and each d.c. load may consist of several series-connected, parallel-connected or series-parallel-connected objects.

In the foregoing, one type of converter bridge has been described, namely the asymmetrically semi-controlled bridge. Other types of converters having a by-pass path for the direct current may be used instead, for example a single-phase bridge having four thyristor branches and being connected in parallel, on its d.c. side, with a by-pass diode, or a diode bridge with alternating voltage control in the leads by the aid of phase-angle controlled antiparallel-connected thyristors.

Furthermore, only single-phase converters have been described above, but the invention may, of course, be applied to other phase numbers as well, for example to three-phase converters.

Each converter may consist of an arbitrary number of series-connected, parallel-connected, or series-parallel-connected converter bridges. Similarly, each bridge branch may consist of a plurality of series-connected, parallel-connected or series-parallel-connected controllable or non-controllable semiconductor elements. Similarly, equipment in accordance with the invention may comprise a plurality of units, in which each unit is, for example, identical with one of the equipments shown in the Figures.

The above description shows how several converter bridges may be connected to each secondary winding of a mains transformer which results in a saving as far as the rated power of the transformer is concerned. However, each converter or converter bridge may, of course, have secondary windings of its own or a secondary winding of its own on the transformer. Nor is it necessary, of course, to have a mains supply transformer; if the voltage and potential conditions so permit, the bridges may be connected directly to an a.c. supply source.

The above description of the converters and their mode of operation assumes that ideal conditions exist. Thus, for example, voltage drops in the converters, commuting times, any necessary limitations of the control angle and incomplete smoothing of the direct currents have not been taken into account.

When, in the above description, the control angle 0° or 180° has been mentioned, it is self-explanatory that the control angle need not assume these values exactly, but only approximately. A deviation of, say, ten to thirty degrees from these values will not fundamentally change the mode of operation of the equipment.

Further, in the above description it has been stated in certain cases that a thyristor is controlled with the control angle 0°. Such control may be accomplished in a known manner by supplying a brief control pulse or a long control pulse to the thyristor at the moment when its anode voltage becomes positive, or by supplying a continuous control current to the thyristor for the part of the cycle during which the thyristor is to operate with the control angle 0°.

Likewise, a control angle of 180° may be accomplished by completely blocking the control pulses to the thyristor for the part of a cycle during which the thyristor is to operate with this control angle.

In the embodiments described above, the control angle is continuously variable between the values corresponding to minimum and maximum direct voltages. Alternatively, of course, the control angle may be variable in steps.

The concept "control range" for a converter refers to the interval within which the direct voltage of the converter may be varied.

In converter equipment in accordance with the invention, the control means operate cyclically, and each cycle may then comprise three or more periods of the mains alternating voltage. A converter included in the equipment is generally controlled with a control angle which assumes at least two different values during a cycle. However, this does not apply in cases of maximum and minimum direct voltages. By this measure the control angles for different parts of the cycle may be chosen such that the power factor of the equipment is increased and the consumption of reactive power is reduced. Further, a converter is controlled such that its control angle is variable for influencing the direct voltage during the smallest possible part of the cycle, namely two half-periods, whereas during the remainder of the cycle it operates with a fixed control angle. The fixed control angles are chosen so as to correspond to a minimum consumption of reactive power, that is, maximum direct voltage or zero direct voltage. By varying the relation between the number of half-periods with maximum direct voltage and the number of half-periods with zero direct voltage within a cycle, the direct voltage of the converter may be varied within the control range. If the control angle is made continuously variable within two half-periods of the cycle, a continuous control of the direct voltage within the whole control range may thus be obtained with a high power factor and a low consumption of reactive power. The control is made such that each separate converter is always controlled in the same way during the positive half-periods of the mains voltage as during its negative half-periods. The d.c. component in the mains alternating current then becomes zero also if the equipment has several converters with direct currents of varying magnitudes.

The invention is applicable to equipment with an arbitrary number of converters, but also to a single converter.

What is claimed is:

1. Electrical converter equipment for the supply of electrical current to at least one d.c. load comprising: a controllable converter connected to an alternating voltage source, said converter having a by-pass path for the direct current, control means for controlling the direct voltage of the converter by influencing the control angle of the converter, the control means operating cyclically such that each operating cycle comprises a plurality of half-periods of the alternating voltage of the alternating voltage source and that the converter within at least part of the control range operates with different control angles during the different half-periods of a cycle, wherein each of said cycles comprises n periods of the alternating voltage of the source, n being an odd number not less than three, said control means, during two of the half-periods of the cycle controlling the converter with a control angle which is variable for influencing the direct voltage of the converter and, during each of the other half periods of the cycle, controlling the converter with a fixed control angle, and the half-periods during which the converter is controlled with said variable control angle being time equidistant.

2. Converter equipment according to claim 1, in which the control means, during each of the half-periods with fixed control angle, control the converter with a control angle which assumes either of two values, one of which is substantially zero and the other which is substantially equal to 180°.

3. Converter equipment according to claim 1, in which the control means are arranged, during each of the half-periods with fixed control angle, to control the converter with a control angle which assumes either of two values, one of which corresponds to maximum direct voltage and the other to minimum direct voltage.

4. Converter equipment according to claim 1, in which during the half-periods of the cycle during which the control means control the converter with a variable control angle, the control means controls the control angle such that it is continuously variable between a value substantially corresponding to minimum direct voltage and a value corresponding to maximum direct voltage.

5. Converter equipment according to claim 1, comprising at least two converters connected to the same alternating voltage source, in which the converters are controlled with the same control pattern, consisting of a sequence of half-periods with certain control angles, the control pattern of the converters being displaced in time relative to each other.

6. Converter equipment according to claim 1, comprising at least two converters connected to the same alternating voltage source, in which the control means are arranged, during each of the half-periods of the cycle, to control one converter with a variable control angle and the other converter or converters with a fixed control angle.

* * * * *